Aug. 21, 1928.

A. C. McBRIDE 1,681,192

VEHICLE BRAKE PEDAL HOLDING MEANS

Filed Feb. 23, 1926

INVENTOR.
ARTHUR C. McBRIDE
BY A. B. Bowman
ATTORNEY

Patented Aug. 21, 1928.

1,681,192

UNITED STATES PATENT OFFICE.

ARTHUR C. McBRIDE, OF SAN DIEGO, CALIFORNIA.

VEHICLE BRAKE-PEDAL-HOLDING MEANS.

Application filed February 23, 1926. Serial No. 89,922.

My invention relates to means for holding brake pedals and the like in certain shifted positions.

The objects of my invention are: First, to provide means of this class whereby a brake pedal or other device, normally shifted in one direction by a spring means, may be readily held in various shifted positions by my means without requiring adjustments; second, to provide a means of this class whereby a brake pedal or other device, normally held in one extreme position by a spring means, may be readily shifted against the spring action and positively held in such shifted position; third, to provide a tool for use when adjusting vehicle brakes, which tool may be readily placed in the cowl of the vehicle against the spring actuated foot brake pedal thereof, whereby the pedal may be readily depressed by hand from the outside of the vehicle and positively held by means of the tool in such depressed position while the brakes are being adjusted; fourth, to provide a device of this class which is automatically extensible and which is provided with an automatic stop to prevent the extensible members from being collapsed relatively to each other; fifth, to provide as a whole a novelly constructed means of this class, and sixth, to provide such a means which is particularly simple and economical of construction, durable, efficient, positive in its action, and which will not readily deteriorate or get out of order.

Figure 1:
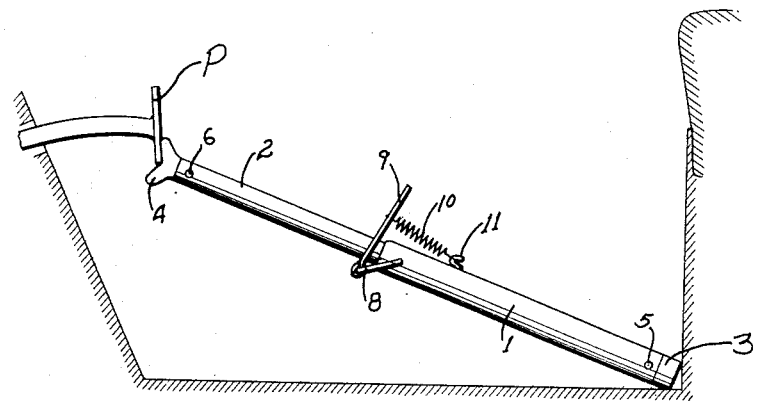
Figure 2:
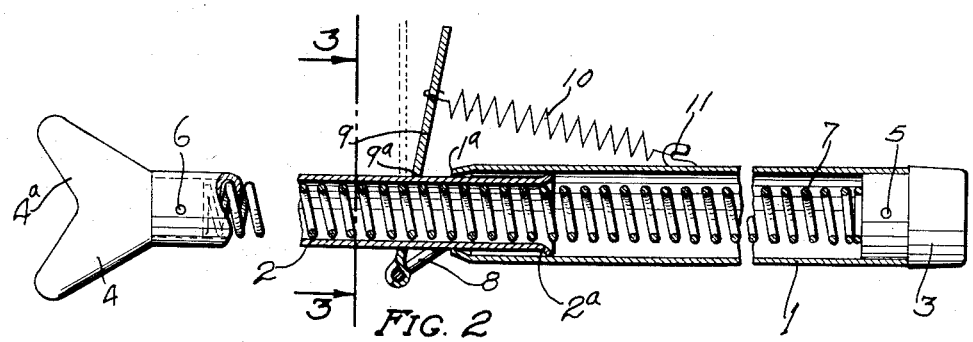
Figure 3:
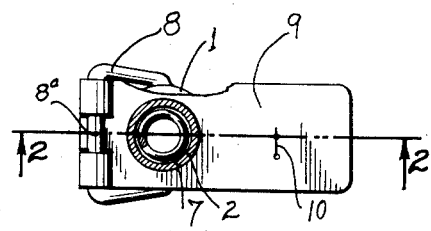
Figure 4:
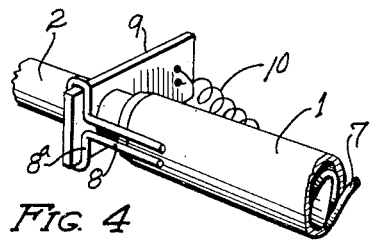

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side view of my vehicle brake pedal holding means, showing the same in position in the cowl of an automobile, with the one end thereof against the brake pedal of the automobile; Fig. 2 is an enlarged longitudinal sectional view thereof, with the section taken through the middle, certain parts and portions being shown in elevation to facilitate the illustration; Fig. 3 is a sectional view thereof, taken through 3—3 of Fig. 2, showing certain parts and portions broken away to facilitate the illustration, and Fig. 4 is a fragmentary perspective view of a slightly modified form of construction of my device, the view being taken from the under side thereof.

Like characters of reference refer to similar parts and portions throughout the several views of the drawings.

The tubes 1 and 2, head members 3 and 4, pins 5 and 6, compression spring 7, bracket 8, friction stop member 9, tension spring 10, and the hook 11, constitute the principal parts and portions of my vehicle brake pedal holding means in its preferred form of construction.

The tubes 1 and 2 are telescopically arranged, the one end of the latter smaller tube 2 being positioned within the one end of the former. The outside diameter of the smaller tube 2 is considerably smaller than the inside diameter of the outer tube 1, providing a space between the same. The inner tube 2 is prevented from being withdrawn from the outer tube 1 by rolling or turning the one end of the latter positioned around the tube 2 inwardly, and also by rolling or turning the end of the tube 2 positioned within the tube 1 outwardly, as shown in Fig. 2, it being noted that the inwardly turned or rolled portion of the member 1, as indicated by $1^a$, is gradual, while the outwardly turned portion of the tube 2, indicated by $2^a$, is abrupt, thus providing a relatively long joint between said tubes when the same are extended and preventing ready distortion thereof.

In the end of the tube 1, opposite its contracted portion, is provided a head member 3, preferably of wood, which is secured to the tube 1 by means of a pin 5. At the opposite end of the tube 2 is also secured a head member 4 by means of a pin 6, said head member 4 extending into the said end of the tube. The outer end of the head member 4 is bifurcated, as indicated by $4^a$, which bifurcated portion is adapted to receive the lower portion of the foot pedal P of the automobile, as shown in Fig. 1.

Within the tubes 1 and 2 is positioned a long compression spring 7, which engages at its ends the head members 3 and 4, as shown in Fig. 2.

Near the contracted end $1^a$ of the tube 1 is secured a U-shaped bracket 8, which extends forwardly and angularly therefrom. On the cross portion $8^a$ of this bracket is pivotally mounted the one end of a friction stop member 9, preferably by splitting said end of the member 9, as shown in Fig. 3, and bending said split portions around the cross portion 8ª of the bracket 8, as shown in Fig. 2. This member 9 is provided intermediate its ends with an elongated circular hole 9ª through which the tube 2 extends. The opposite or free end of the member 9 is connected, by means of the tension spring 10, to a hook 11 secured to the outer side wall of the tube 1 a considerable distance from its contracted end, as shown in Figs. 1 and 2.

When applying this tool or means to the brake pedal of an automobile for adjusting the brakes thereof, the tool is positioned in the cowl of the automobile, as shown in Fig. 1, with the head member 3 in the corner between the floor and the lower portion of the seat and the bifurcated head member 4 against the foot pedal P. When desiring to obtain a certain tension on the brake, the pedal P is depressed, either by foot, or with the hand from the outside of the automobile. The compression spring 7 within the tubes will automatically extend the device and force the spring 7 thereof to act against the spring of the brake pedal. The tubes 1 and 2, however, are prevented from being contracted by means of the friction stop member 9, which is positioned around the tube 2. The tension spring 10 normally forces the edges of the hole 9ª against the exterior surface of the tube 2, causing tight frictional engagement between said members and preventing the tube 2 from being forced into the tube 1, except as the free end of the member 9 is shifted forwardly by hand.

In Fig. 4 of the drawings I have shown a slightly modified form of construction in which the one end of the friction stop member 9 is loosely connected to the bracket 8 by inserting said end into a long transversely slotted portion 8ª in the forwardly extended end of the member 8. With this latter construction the member 8 may be distorted slightly without causing unnecessary binding of the stop member 9 with the tube 2. The member or bracket 9 may be made of wire, as shown, or the same may be made of a sheet metal stamping or of a casting if desired.

Though I have shown and described a particular construction, combination and arrangement of parts and portions and a certain modification thereof, I do not wish to be limited to this particular construction, combination and arrangement nor to the modification, but desire to include in the scope of my invention, the construction, combination and arrangement substantially as set forth in the appended claims.

Having thus described my invention, what I claim as new and desire to secure by Letters Patent is:

1. In a device of the class described, a pair of telescoping tubes, a spring means positioned within said tubes tending to force the same in one extreme position, and friction stop means mounted on one of said tubes tending to frictionally hold the other from being forced against the action of the spring means.

2. In a device of the class described, a pair of telescoping tubes, the one having a head member for receiving a brake pedal or the like, a compression spring positioned within said tubes tending to force the same apart, a friction stop lever pivotally mounted on the outer tube in engagement with the inner tube tending to prevent the latter from being forced inwardly against the action of said spring, and a tension spring secured to the free end of said lever and to the outer tube tending to hold said lever in frictional engagement with said inner tube.

3. In a device of the class described, a pair of longitudinally intershiftable members, a spring means in association therewith tending to force the same apart, a friction stop lever having an opening intermediate its ends through which one of said members extends, the one end of said lever being loosely pivoted on and longitudinally extendible relatively to a bracket portion at the adjacent end of the other member.

4. In a device of the class described, a pair of telescoping tubes, the one having a head member for receiving a brake pedal or the like, a compression spring positioned within said tubes tending to force the same apart, the one end of said spring engaging the inner portion of said head member of one of said telescoping tubes, and the other end engaging a plugged end of said other telescoping tube, a friction stop lever pivotally mounted on the outer tube in engagement with the inner tube tending to prevent the latter from being forced inwardly against the action of said spring, and a tension spring secured to the free end of said lever and to the outer tube, tending to hold said lever in frictional engagement with said inner tube.

In testimony whereof, I have hereunto set my hand at San Diego, California, this 5th day of February, 1926.

ARTHUR C. McBRIDE.